United States Patent [19]

Bongort et al.

[11] 4,165,935

[45] Aug. 28, 1979

[54] DIFFERENTIAL FLOAT CONTROL

[75] Inventors: Edgar A. Bongort, Southfield; William T. Cruickshank, Pontiac, both of Mich.

[73] Assignee: B/W Controls Inc., Birmingham, Mich.

[21] Appl. No.: 845,293

[22] Filed: Oct. 25, 1977

[51] Int. Cl.$^2$ ............................................. H01H 9/00
[52] U.S. Cl. ...................................... 335/207; 200/84 C
[58] Field of Search ........................ 335/205, 206, 207; 200/84 C

[56] References Cited

U.S. PATENT DOCUMENTS

| | | | |
|---|---|---|---|
| 3,437,771 | 4/1969 | Nusbaum | 200/84 C |
| 3,646,293 | 2/1972 | Howard | 335/207 X |

*Primary Examiner*—George Harris
*Attorney, Agent, or Firm*—Burton, Parker & Schramm

[57] ABSTRACT

A differential float control is provided by a single switch and a single float wherein a vertical guide tube contains a magnetically operated switch, and a free float surrounds the tube and rises and falls with the liquid level and carries two magnets. As the float moves in one direction the switch is magnetically latched closed by one magnet and remains closed until unlatched by the other magnet as the float returns in the opposite direction. The switch may be normally open, or normally closed, so that movement of the float may provide any desired circuit sequence for operating a liquid level controlling pump or the like for maintaining the liquid level within prescribed limits.

16 Claims, 2 Drawing Figures

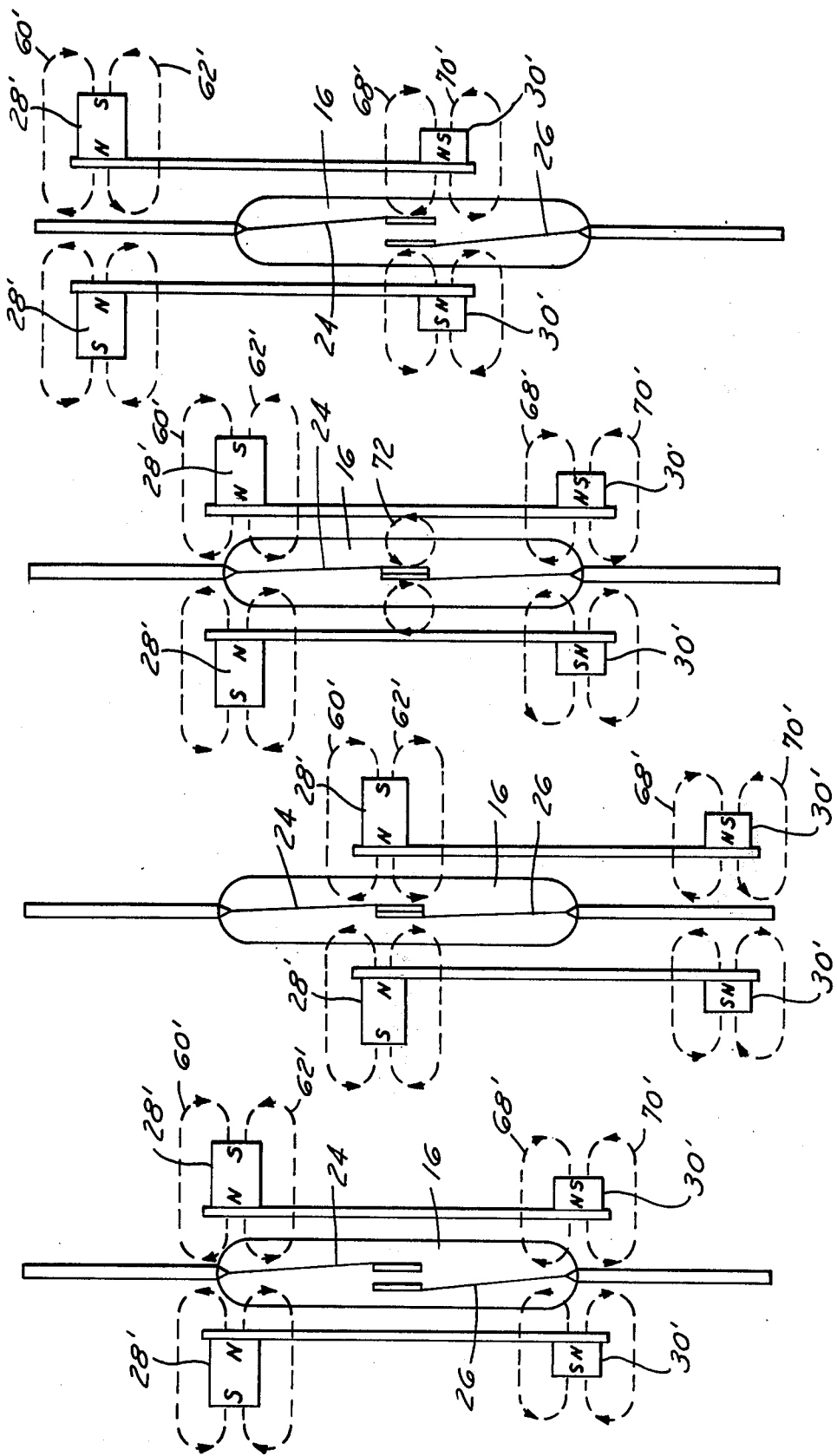

DIFFERENTIAL FLOAT CONTROL

FIELD OF INVENTION

This invention relates to position sensing apparatus, in particular liquid level sensing devices of the type having a vertical guide tube containing a magnetic proximity switch and a free float slidable on the tube and buoyant in the liquid to rise and fall with its level, and in passing the switch to actuate it.

BACKGROUND OF THE INVENTION

It is known in the art to provide a liquid level sensor comprising a non-magnetic guide tube vertically arranged in the liquid whose level is to be sensed, with a plurality of reed switches disposed spaced apart in the tube to be actuated by a magnet carried by a float guided on the tube and rising and falling with the liquid level. The reed switches are connected by electric circuits to signal various liquid levels, and may serve to energize pumps, alarms, indicators and the like. The following United States Patents are representative of such teaching: U.S. Pat. Nos. 3,198,902; 3,200,645; 3,646,293; 3,678,750; 3,685,357; 3,788,340; 3,826,139.

To obtain a differential switch using the construction of the majority of these patents requires two switches, one at each extremity of travel, with one or more magnets activating the switches. U.S. Pat. No. 3,198,902 attempts to remedy this by using two magnets and a switch which is activated to predetermined conditions when the switch is swept by opposite poles. However, the construction used in this patent is only correctly activated by passage of the magnetic fields through a small sensing area.

SUMMARY OF THE INVENTION

The present invention provides a differential float control having one reed switch within a vertically positioned guide tube. The reed switch has its reeds extending substantially parallel to the axis of the guide tube. A float, externally surrounding the guide tube has free rotatable and longitudinal movement on the guide tube rising and falling with the liquid level.

Magnet means are provided establishing a pair of vertically spaced apart symmetrical toroidal magnetic fields about the guide tube. Each symmetrical toroidal magnetic field has leading and trailing portions of opposite direction for sweeping the switch reeds, viz., leading and trailing in relation to float movement along the guide, and "opposite direction" having reference to the direction of the magnetic lines of flux.

One of the fields will close the switch reeds as the float approaches the switch moving in one direction, and the other field will open the switch as the float approaches the switch moving in the opposite direction. Between opening and closing positions of the float, the switch remains in the condition to which it has been actuated. The switch is retained in a closed condition by a magnetic bias field provided by a bias magnet or by inherent residual magnetism in the switch reeds.

A number of advantages are obtainable from a differential float control of the kind herein disclosed, namely:

1. The sensor utilizes only one float to operate one switch instead of one float for each latching condition.
2. The sensor can be used in any liquid, conductive or non-conductive.
3. The sensor is suitable for pressurized applications as well as non-pressurized environments.
4. The sensor can work from AC or DC current.
5. The sensor is suitable for variable electrical environments.

BRIEF DESCRIPTION OF THE DRAWINGS

FIGS. 4A, 4B, 4C and 4D are similar to FIGS. 3A-3D, except they illustrate the action on a reed switch where the lower field is of a reverse polarity.

BRIEF DESCRIPTION OF PREFERRED EMBODIMENTS

Figure 1:
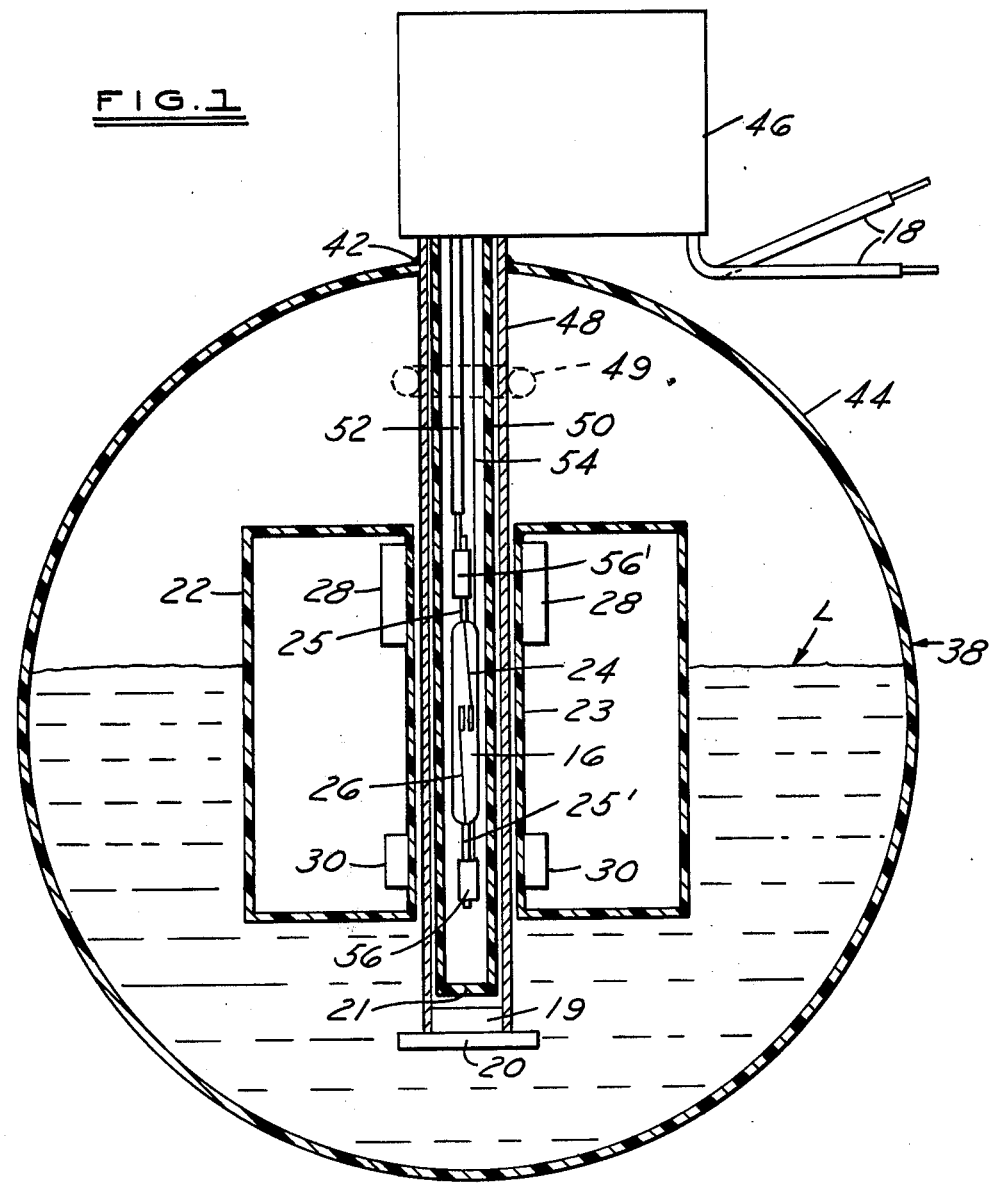
FIG. 1 is a cross sectional view through a carbonator showing a differential float control embodying the invention.

In FIG. 1 an installation for a differential float control is depicted as comprising a tank 38, such as a carbonator, having cylindrically shaped walls 44 with a liquid L therein to be sensed. A guide tube 48 is shown arranged vertically within the tank 38 with a free float 22 mounted on the tube for guided movement therealong as the liquid level rises and falls. The buoyancy of float 22 should be such that it will be supported by the liquid with approximately fifty percent of the float submerged and its water line substantially midway between its upper and lower ends as shown.

The guide tube 48 may be secured to a junction box 46 in various ways commonly known in the art. In the embodiment shown in FIG. 1, the guide tube is secured to the cylindrical walls 44 of tank 38 by a weld 42 sufficient to hold the guide tube rigid and seal the carbonator. The guide tube should be formed of a non-magnetic material and may be of any suitable diameter. The cavity of the guide tube is sealed from the tank's liquid by use of a neoprene or other suitable elastomeric or metallic plug having a stem portion 19 wedged inside the lower end of the tube and a flanged portion 20 overlying and abutting the lower edge of the tube. The flange portion 20 extends radially outward and serves as a stop surface for supporting the lower edge of the float 22.

A reed switch 16 is supported in the guide tube. The reed switch has a glass envelope within which are positioned a pair of flexible magnetic reeds 24 and 26, or contacts, with one reed extending from each end of the envelope and with the reeds having overlapping contact faces substantially midway of the length of the envelope. Terminals 25 and 25' extend from opposite ends of the envelope and are connected to the reeds. We have found that the reed switch 16 may be conveniently supported in the guide tube by the conductive wires themselves. Conductor wire 54 is attached to terminal 25' by a splice 56. An insulated conductor wire 52 is connected to terminal 25 by a splice 56'. Thus a subassembly is constructed which can be vertically positioned at any convenient location. The conductor wires are then brought into junction box 46 and secured. To further protect against contamination of the conductor wires and switch 16, and prevent any grounding of the conductor wires with the tube 48, an inner tube 50 of non-conductive material, such as plastic, encircles the wires and switch and is closed at its lower end 21 and opens into the junction box 46 at its upper end.

Figure 2:
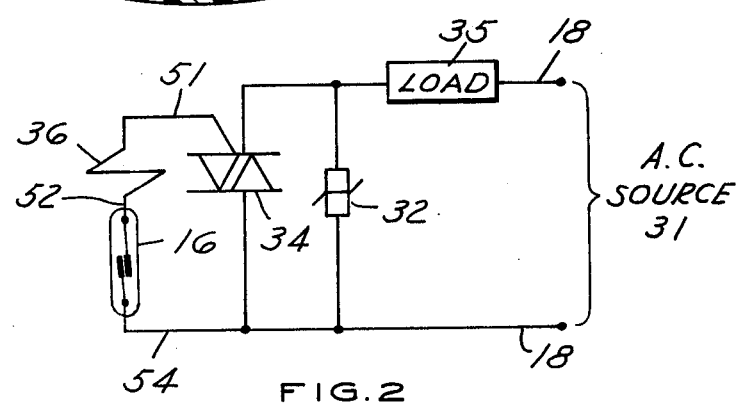
FIG. 2 schematically illustrates a control circuit for our differential float control.

Junction box 46 receives conductor wires 54 and 52 into an electrical circuit disposed within the box as shown in FIG. 2. The circuit comprises a protective varistor 32 which shorts all abnormally large voltages, thereby protecting the primary circuit. Conductor wire 52 is connected to a resistance 36 which maintains a small current through the switch, merely sufficient to trigger the gate of triac 34 through gate lead 51. This gate triggers on a small level of current on either direction of the AC source 31 connected to leads 18. Thus on every half cycle, the gate will be triggered providing the switch is closed. When the gate is triggered, the majority of current will flow through the triac which will appear to be a low resistance when conducting. Thus the current allowed to pass through the triac is large enough to drive a large load 35 such as a pump, solenoid valve, relays, alarms or other suitable equipment which is likely to be driven.

In the operation of the FIGS. 1 and 2 embodiment as used, for example, in a carbonator, the switch 16 is closed when the float 22 descends to a certain minimum level and this serves to start a pump motor 35, which causes liquid to be pumped into the tank. Switch 16 remains closed as liquid is pumped into the tank, and the float continues to rise until the float reaches a certain maximum height whereupon it causes the switch 16 to open, stopping the pump. The switch then remains open while the float falls with the liquid level back down to the minimum level where the switch again closes starting the pump motor and repeating the cycle.

The float 22 may be formed of any suitable non-magnetic material. Consequently, any suitable plastic or austenitic stainless steel may be used. The float is hermetically sealed. If desired, the float may be filled with a closed cell foam, thereby retaining buoyancy despite puncture of the float. In the preferred form the float comprises a cylindrically shaped hollow annulus symmetrical along its longitudinal axis. The float is sized to be a free sliding fit about the guide tube. Secured to the inside diameter wall or central tube 23 of the float is the float magnet means. The float magnet means comprises two magnet arrays 28, 30. The lower magnet array 30 is secured near the bottom of the float and may be the same size or smaller than the upper magnet array 28 which is secured near the top of the float. In the event that the lower magnet array 30 is the same size as the upper magnet array 28, an upper fail safe stop 49 should be used to prevent the float from rising above the switch. Each float magnet array is arranged to provide a symmetrical toroidal magnetic field having upwardly and downwardly extending field portions of opposite magnetic direction. This is accomplished in various ways, but fundamentally each magnet 28 and 30 is annular with one pole facing radially inwardly and another radially outwardly. Each float magnet may comprise a plurality of small bar magnets arranged around and extending radially with respect to the guide tube axis or a permanent magnet with the proper polarity and of the proper circular dimension. An alternative type of float magnet is the rubber-bonded barium ferrite composite material as described in our aforesaid co-pending patent application Ser. No. 627,518. The magnets are symmetrically arranged around the central tube 23 of the float and substantially equidistant above and below the "waterline" of the float.

Figure 3D:
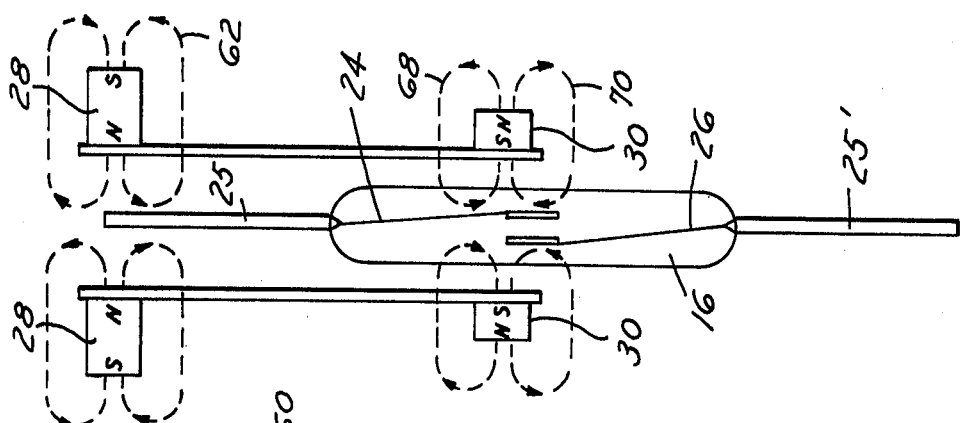
FIGS. 3A, 3B, 3C and 3D schematically illustrate the magnetic fields and their co-action and effect on a reed switch during a rise and a fall of the float.
Figure 3C:
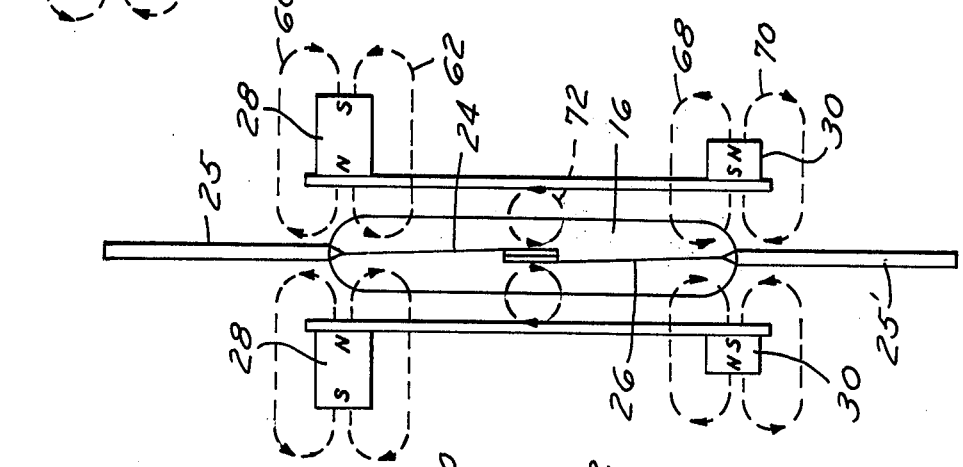

The reed switch 16 is arranged in the guide tube to have its axis extend longitudinally thereof and parallel to the axis of the symmetrical toroidal magnetic field established by the magnet means. The effect of the float magnets on the operation of reed switch 16 is best understood by reference to FIGS. 3A–3D. In this arrangement the switch reeds 24 and 26 are normally spring biased apart and are made of a material capable of having a high residual magnetism thereby providing a magnetic bias field to retain the contacts in a closed condition once they're latched closed. Such a reed switch can be latched closed by a strong magnetic field of one direction and latched open by a weak magnetic field of opposite direction. FIG. 3A shows one such switch 16 arranged with the float magnets disposed such that two fields of different strengths are provided to sweep the switch.

As shown in FIG. 3A, the upper magnet 28 has its north poles pointing radially inwardly and the lower magnet 30 which is of lesser strength has its south poles pointing radially inwardly.

In FIG. 3A, magnet 28 has upwardly and downwardly directed field portions 60 and 62 which are respectively leading and trailing field portions when the float is rising, and trailing and leading portions respectively when the float is falling. Magnet 30 has similar oppositely directed field portions 68 and 70 of weaker intensity than those of magnet 28.

Figure 3B:
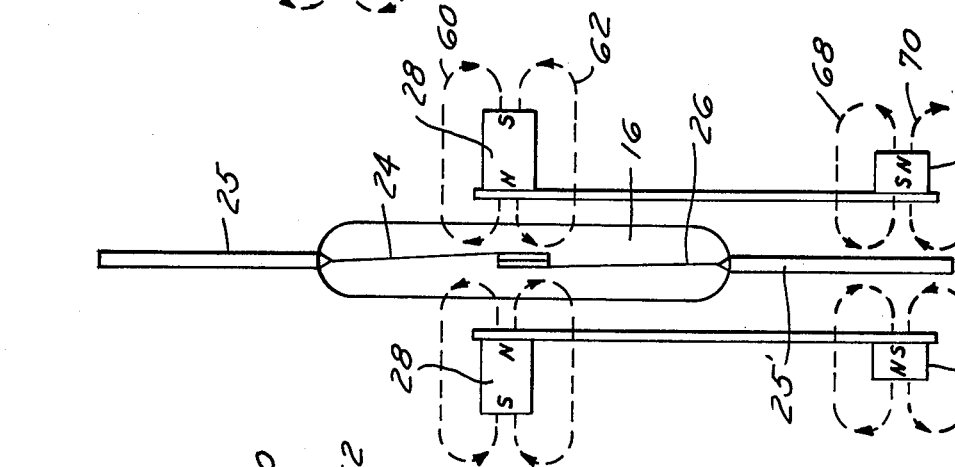
Figure 3A:
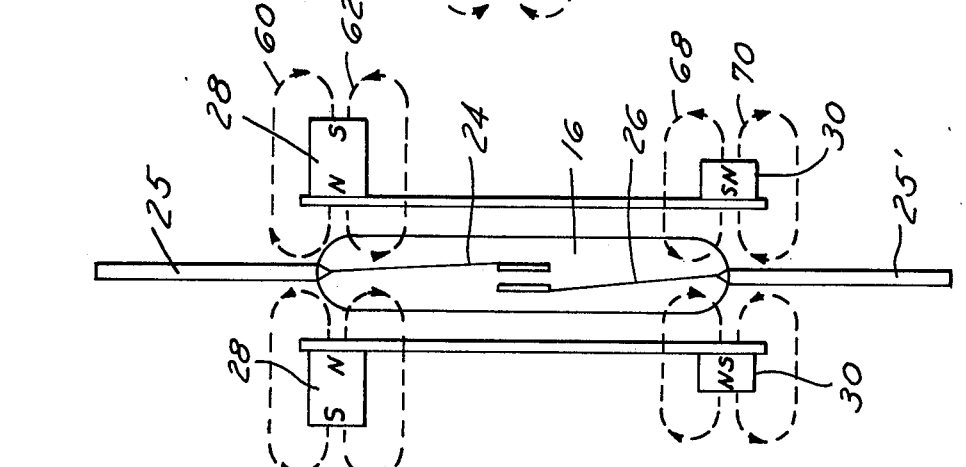

In operation, assume the float falls with a dropping liquid level from FIG. 3A to 3B, at the Fig. 3B position the contacts 24 and 26 close under the influence of the strong magnetic leading field portion 62 of magnet 28. The closing of the contacts starts pump 35 (FIG. 2) which causes the liquid and float to rise carrying magnet 28 above contact 24, as in FIG. 3C. The residual magnetic field 72 in the contacts provides a magnetic bias field which retains the contacts in closed condition, although the contacts are no longer influenced by field portion 62. The contacts remain in the closed condition as the float continues to rise and will not open until influenced by the lower magnet 30 as shown in FIG. 3D and hereinafter explained.

As the float rises from FIGS. 3B to 3D the field portion 68 shown in FIG. 3C of lower magnet 30 is of the same direction as the residual magnetic field 72, and consequently retains contacts 24 and 26 in their closed condition. Upon further rise of the float, however, a point is reached when the trailing field portion 70 of lower magnet 30 neutralizes the residual magnetism in the contacts causing the contacts to spring open. Once the float starts to descend, the switch will again be influenced by field portion 68. However, this field portion is too weak to close the open switch and the switch remains open until the float descends to the position where leading field portion 62 of upper magnet 28 (see FIG. 3B) once again closes the contacts. We have found that when the magnet arrays 28 and 30 are arranged as shown in FIGS. 3A–3D, i.e., with unlike poles facing inwardly toward the guide tube, the magnetic strength of one of the arrays (30 as shown) must be weaker than the other in order for the switch 16 to be closed when the float is moving in one direction and open when the float is moving in the opposite direction.

Referring now to FIGS. 4A–4D, a modification is shown in which the pair of float magnets have like poles facing in the same direction. For example, as shown, the upper and lower magnets 28' and 30' have the north poles facing inwardly and the south poles facing radially outwardly. Magnet 28' is shown as being stronger than magnet 30', though they may be of equal strength. In operation, when the float is at the position in FIG. 4B the contacts 24 and 26 are closed under the influence of field portion 62' of upper magnet 28', and remain closed even though the float rises to the position of FIG. 4C. The contacts 24, 26 of the switch 16 remain closed under the influence of the residual magnetism 72. As the float continues to rise, a point is reached when the leading field portion 68' of the lower magnet 30' neutralizes the residual magnetism in the contacts causing the contacts to spring open. The contacts remain open until the float again descends to the FIG. 4B position where the stronger leading field portion 62' of magnet 28' latches the switch closed, and the cycle is ready to repeat. Reverse operation of the reed switch may be obtained where magnet array 28' is stronger than magnet array 30' simply by turning the float end-for-end on the guide tube.

Figure 5A:
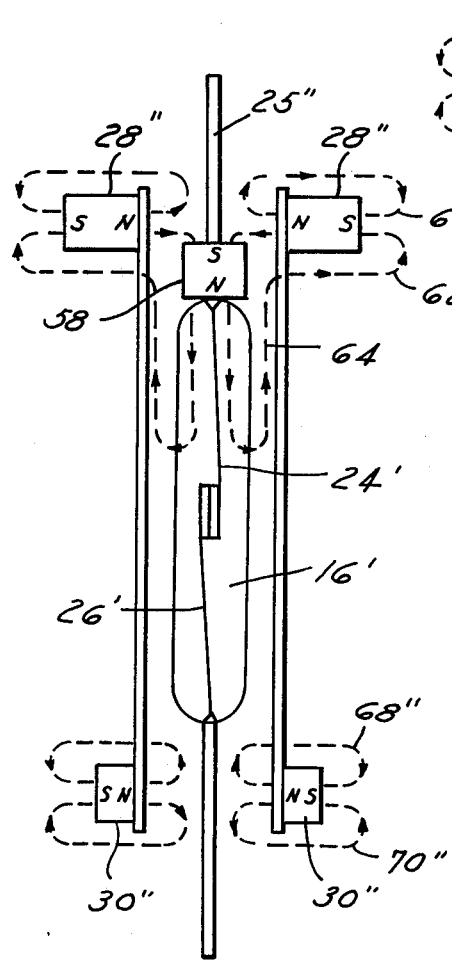
FIGS. 5A and 5B are similar to FIGS. 4A-4D, except they illustrate the action on a reed switch where a bias magnet provides a field to hold the switch closed.
Figure 5B:
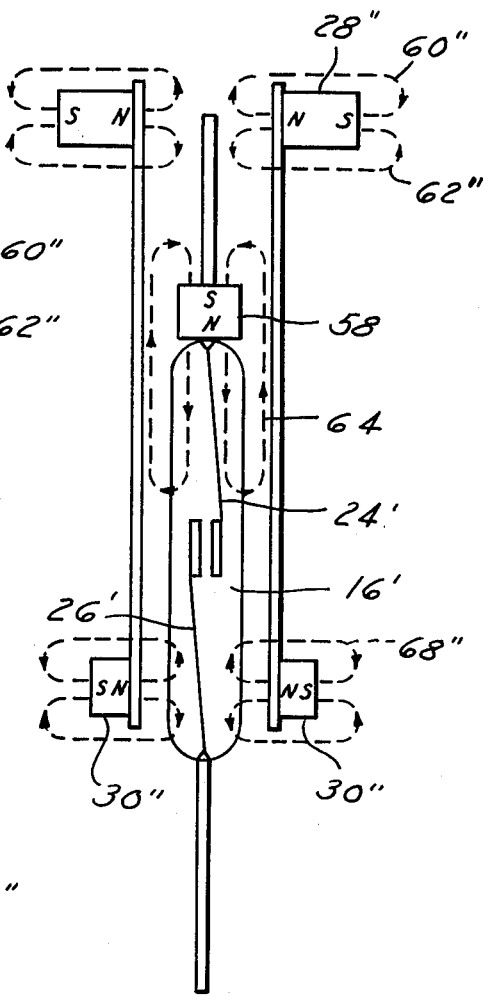

In the FIGS. 5A-5B embodiment, the switch reeds 24' and 26' have no capacity for retaining residual magnetism. To make the switch self-latching we have associated with it a small bias or latching magnet 58 which has its poles or magnetic axis arranged parallel to the axis or reeds of the reed switch and provides a magnetic bias field to retain the contacts in a closed condition when actuated to such a condition. The bias magnet may be formed of any suitable magnet material but preferably comprises a rubber-bonded barium ferrite composite. A small piece of such material with a hole pierced therethrough is slipped over the upwardly projecting terminal 25". In FIGS. 5A and 5B, the float magnets are disposed in the same configuration as in FIGS. 4A-4D, with the north poles of both magnets inwardly facing the guide tube axis, and with their south poles radiating outwardly from such axis. In FIG. 5A, the float has descended until its upper magnet field portion 62" augments bias magnet 58, thereby closing the contacts. As the float rises, the magnetic field of the bias magnet 58 will continue to hold the reed switch contacts in the closed position until field portion 68" approaches sufficiently closely switch 16' so that the field 68" will polarize the contact 26' in a direction similar to that of field portion 64, thereby repelling contact 24' and causing the switch to open. The switch will now continue to remain open despite descent of the float until field portion 62" again augments the direction of the field portion 64 closing the contacts. It will be apparent that the magnetic force of field portion 64 of bias magnet 58 is insufficient to close the contacts, but once closed is capable of holding them closed.

By varying the distance between magnets 28 and 30 the opening and closing differential may be varied. By accurate positioning of the switch in the guide tube, a sensor having considerable range and accuracy is obtained, without the necessity of providing two switches, a complicated interpreting circuit, etc.

What is claimed is:

1. A differential float control comprising, in combination:
   a guide tube for vertical positioning in the liquid whose level is to be sensed;
   a float externally surrounding the guide tube for free rotatable and longitudinal movement thereon to rise and fall with the liquid level;
   a reed switch in the guide tube having its reeds extending substantially parallel to the axis of the guide tube;
   means for establishing a magnetic bias field across the reeds insufficient to close them but sufficient to hold them closed; and
   magnet means on the float for establishing a pair of vertically spaced apart symmetrical toroidal magnetic fields for actuating the switch reeds, one such field closing the reeds as the float moves in one direction and the other such field overcoming the bias field and opening the switch reeds after the float moves a predetermined distance in the opposite direction.

2. The invention defined by claim 1 characterized in that one of said pair of magnetic fields is less than or of equal strength to the other field and common poles of the fields face inwardly.

3. The invention defined by claim 1 characterized in that said magnetic fields have different strengths and unlike poles of the fields face inwardly.

4. The invention defined by claim 1 characterized in that said means for establishing a magnetic bias field comprises a bias magnet disposed adjacent the switch.

5. The invention defined by claim 1 characterized in that said means establishing a magnetic bias field comprises switch reeds having a residual magnetism sufficient to hold them closed following impression of a magnetic field sufficient to close them.

6. The invention defined by claim 1 characterized in that said magnet means on the float comprises a plurality of magnets arranged in vertically spaced apart planes around the guide tube in radially extending relation therewith, said magnets disposed substantially perpendicular to the guide tube with all the magnets in one plane having their north pole facing the guide tube and all the magnets in the other plane having their south pole facing the guide tube and with the strength of the field created by the magnets in one of said planes being weaker than the magnetic field created by the magnets in the other plane.

7. The invention defined by claim 1 characterized in that said means on the float comprises a plurality of magnets arranged in vertically spaced apart planes around the guide tube in radially extending relation therewith, said magnets disposed substantially perpendicular to the guide tube with all the magnets in one plane having their north pole facing the guide tube and all the magnets in the other plane having their north poles facing the guide tube, and with the strength of the field created by the magnets in one of said planes being weaker than the magnetic field created by the magnets in the other plane.

8. The invention defined by claim 1 characterized in that the magnetic field which closes the reeds is stronger than the magnetic field which opens the reeds.

9. The invention defined by claim 1 characterized in that the magnetic field which closes the reeds is of the same strength as the magnetic field which opens the reeds.

10. The invention defined by claim 1 characterized in that each vertically spaced apart magnetic field has a pair of oppositely directed symmetrical toroidal magnetic field portions for sweeping the switch reeds.

11. The invention defined by claim 10 characterized in that the symmetrical toroidal magnetic field portion of the weaker magnet having the same direction as the symmetrical toroidal magnetic field portion of the stronger magnet which closed the switch reeds has insufficient strength to close the reeds.

12. The invention defined by claim 1 wherein said predetermined distance is approximately the vertical distance between said magnetic fields.

13. The invention defined by claim 1 characterized in that the one field is adjacent the upper end of the float and the other field is adjacent the lower end of the float.

14. The invention defined by claim 1 characterized in that the one field closing the reeds and the other field opening the reeds are substantially equidistant above and below the liquid line of the float.

15. The invention defined by claim 1 characterized in that said magnet means comprises a pair of vertically spaced apart strips of rubber-bonded barium ferrite composite material affixed to the central tube with opposite poles facing away from the tube.

16. A differential position control comprising, in combination:

a carrier for movement along a predetermined path of travel;

a reed switch adjacent said path of travel and having its reeds extending substantially parallel thereto;

means for establishing a magnetic bias field across the reeds insufficient to close them but sufficient to hold them closed; and magnet means on the carrier for establishing a pair of magnetic fields spaced apart along said path of travel and each having leading and trailing portions of opposite direction for sweeping the switch reeds, one such field closing the reeds as the carrier reaches one predetermined position along the path of travel adjacent the switch moving in one direction, and the other such field overcoming the bias field and opening the switch reeds as the carrier reaches another predetermined position along the path of travel adjacent the switch moving in the opposite direction.

* * * * *